UNITED STATES PATENT OFFICE.

BENJAMIN F. KING, OF ANNAPOLIS JUNCTION, MARYLAND.

IMPROVEMENT IN PAINTS.

Specification forming part of Letters Patent No. 120,751, dated November 7, 1871.

*To all whom it may concern:*

Be it known that I, BENJAMIN F. KING, of Annapolis Junction, in the county of Howard and State of Maryland, have invented a new and valuable Improvement in the Method of Mixing Paints; and I do hereby declare that the following is a full, clear, and exact description of the composition of the same.

My invention relates to the composition and mixture of paints; and consists in compounding the ingredients herein mentioned in the manner described.

I take of hot water three gallons, of glycerine one ounce, of washing-soda one ounce, of citrate of potassa two and one-fourth ounces, and of fresh lime three pounds. I mix these articles well together and let the solution stand twenty-four hours. I next add to the solution one and one-fourth gallon of linseed-oil, and twenty-five pounds, more or less, of white lead or other paint, and one quart of varnish. I stir the new compound well until it is thoroughly mixed, and then reduce it to the requisite consistency by adding benzine or spirits of turpentine.

I claim as my invention—

The combination of the ingredients herein mentioned in the manner specified.

In testimony that I claim the above I have hereunto subscribed my name in the presence of two witnesses.

BENJAMIN F. KING.

Witnesses:
   WM. R. DUVALL,
   JAMES L. DUVALL.

(107)